United States Patent [19]

Shoup

[11] 4,212,139
[45] Jul. 15, 1980

[54] HEAVY DUTY DRAWBAR

[75] Inventor: Stephen G. Shoup, Peoria, Ill.

[73] Assignee: Caterpiller Tractor Co., Peoria, Ill.

[21] Appl. No.: 814,380

[22] Filed: Jul. 11, 1977

[51] Int. Cl.² .............................................. E04C 3/32
[52] U.S. Cl. ..................................................... 52/721
[58] Field of Search ................... 280/495, 496, 491 R, 280/491 A, 491 B, 491 C, 491 D, 491 E, 491 F; 52/729, 732, 618, 721

[56] References Cited

U.S. PATENT DOCUMENTS

| | | | |
|---|---|---|---|
| 1,967,828 | 7/1934 | Leake | 14/14 |
| 2,056,563 | 10/1936 | Budd et al. | 52/729 X |
| 2,108,795 | 2/1938 | Budd | 52/729 X |
| 3,117,805 | 1/1964 | Schoeffler | 280/491 B |
| 3,480,296 | 11/1969 | Starling | 280/491 R |
| 3,578,358 | 5/1971 | Reynolds | 280/495 X |
| 3,838,872 | 10/1974 | Fullhart | 280/495 |
| 3,843,165 | 10/1974 | Mathisen | 280/495 |

FOREIGN PATENT DOCUMENTS

| | | | |
|---|---|---|---|
| 2150643 | 4/1972 | Fed. Rep. of Germany | 52/729 |
| 1353612 | 1/1964 | France | 52/729 |
| 454752 | 10/1936 | United Kingdom | 52/729 |
| 845429 | 11/1956 | United Kingdom | 52/729 |
| 1405146 | 9/1975 | United Kingdom | 14/13 |

*Primary Examiner*—John J. Love
*Assistant Examiner*—Norman L. Stack
*Attorney, Agent, or Firm*—Phillips, Moore, Weissenberger, Lempio & Majestic

[57] ABSTRACT

A heavy duty drawbar features a Z-type brace which is accessible from the end of a vehicle which carries the drawbar. The Z-type brace provides significant strength for the overall drawbar while still allowing easy access to the hitch fastening bolts for easy changing. Also, the hitch can be placed very close to the vehicle when held by such a Z-type brace. Two of the Z-type braces are supported each between generally vertical frame members and the hitch of the drawbar is supported between the two Z-type braces.

1 Claim, 3 Drawing Figures

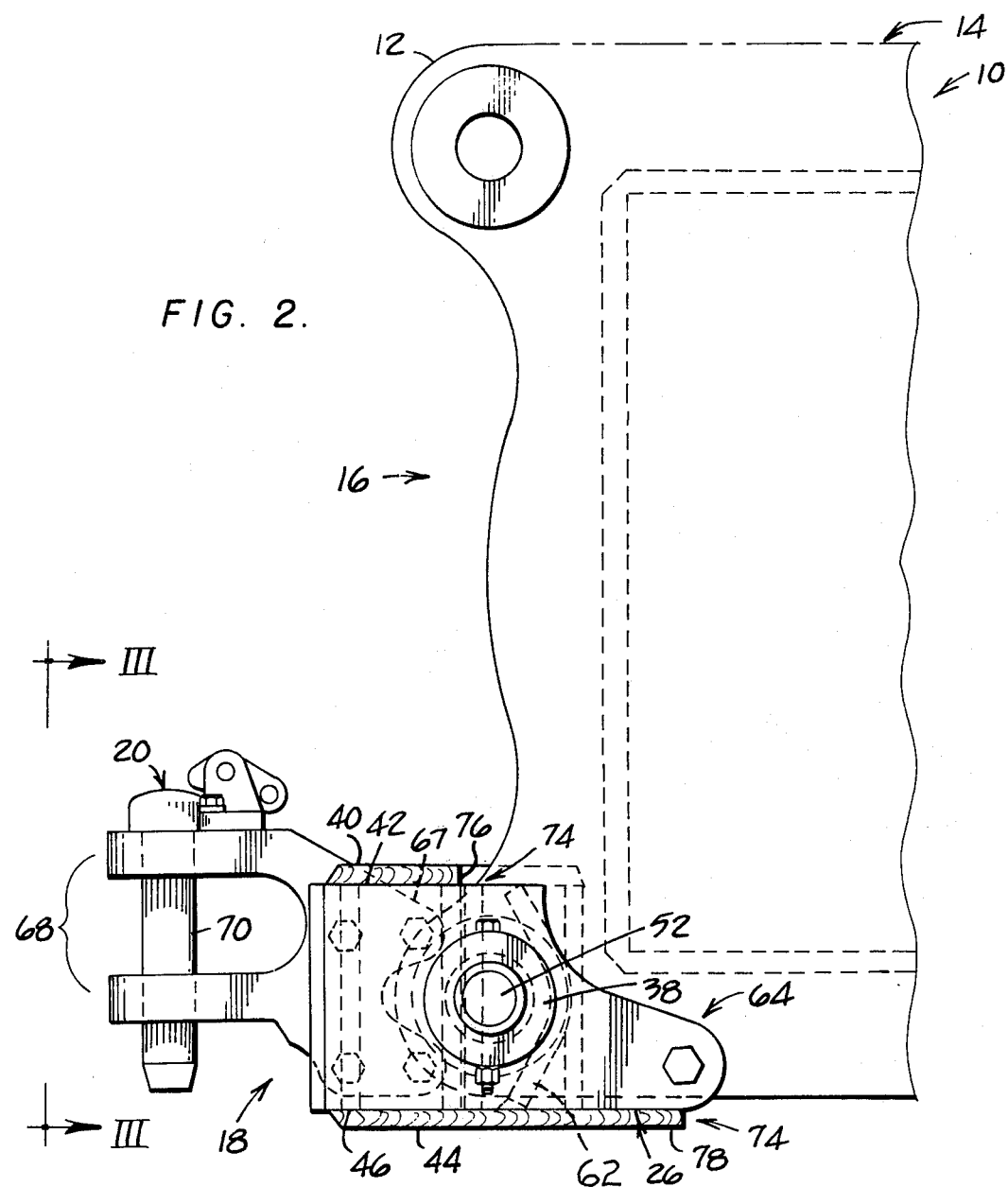

4,212,139

HEAVY DUTY DRAWBAR

BACKGROUND OF THE INVENTION

1. Field of the Invention

The invention relates to a bracing structure and to a drawbar unit for a vehicle which utilizes such a bracing structure. Such drawbar units are particularly useful with construction vehicles.

2. Prior Art

The attachement of drawbars to vehicles such as heavy construction vehicles is well known. Generally, such drawbar units have been attached to the transmission case at the back of such vehicles. This has created very serious problems in that when heavy loads are being pulled by the vehicle the bolts which are holding the drawbar unit to the transmission case will often fail. Also, the transmission case itself may be ripped off or at least badly bent if the bolts themselves do not fail with the damage occurring generally adjacent the points of attachment of the bolts to the transmission case. Still another problem with prior art drawbar units has been that they tend to be relatively bulky and also relatively difficult and time consuming to fasten in place and remove. Still further, the prior art drawbar units have tended to extend a relatively great distance rearwardly of the main frame of the vehicle carrying them. This has created problems of relatively large moments being created which cause relatively large stresses at the points of attachment of the drawbar unit to the vehicle.

SUMMARY OF THE INVENTION

The present invention is directed to overcoming one or more of the problems as set forth above.

According to the present invention there is provided a bracing structure for supporting an article generally centrally intermediate and extending longitudinally away from the first ends of a pair of generally parallel spaced apart members. The bracing structure comprises a pair of generally Z-shaped brace means, each having a first leg thereof affixed to the article, a second leg thereof affixed to a respective one of the members and a bridge from generally a first end of the first leg, said first end of said first leg being longitudinally removed from the first ends of the members towards the second ends thereof to generally a second end of the second leg, said second end of said second leg being longitudinally intermediate the first end of the first leg and the first ends of the members.

The bracing structure of the present invention is intended to provide the strength attainable with a conventional box-beam structure and to further afford greater convenience in providing accessibility to the fastener members used in connecting the bracing structure to adjacent componentry.

BRIEF DESCRIPTION OF THE DRAWINGS

The invention will be better understood by reference to the figures of the drawings wherein like numbers denote like parts throughout and wherein:

FIG. 2 illustrates a view taken along the line II—II of FIG. 1; and

FIG. 3 illustrates a view taken along the line III—III of FIG. 2.

DETAILED DESCRIPTION OF THE PREFERRED EMBODIMENT

Figure 1:
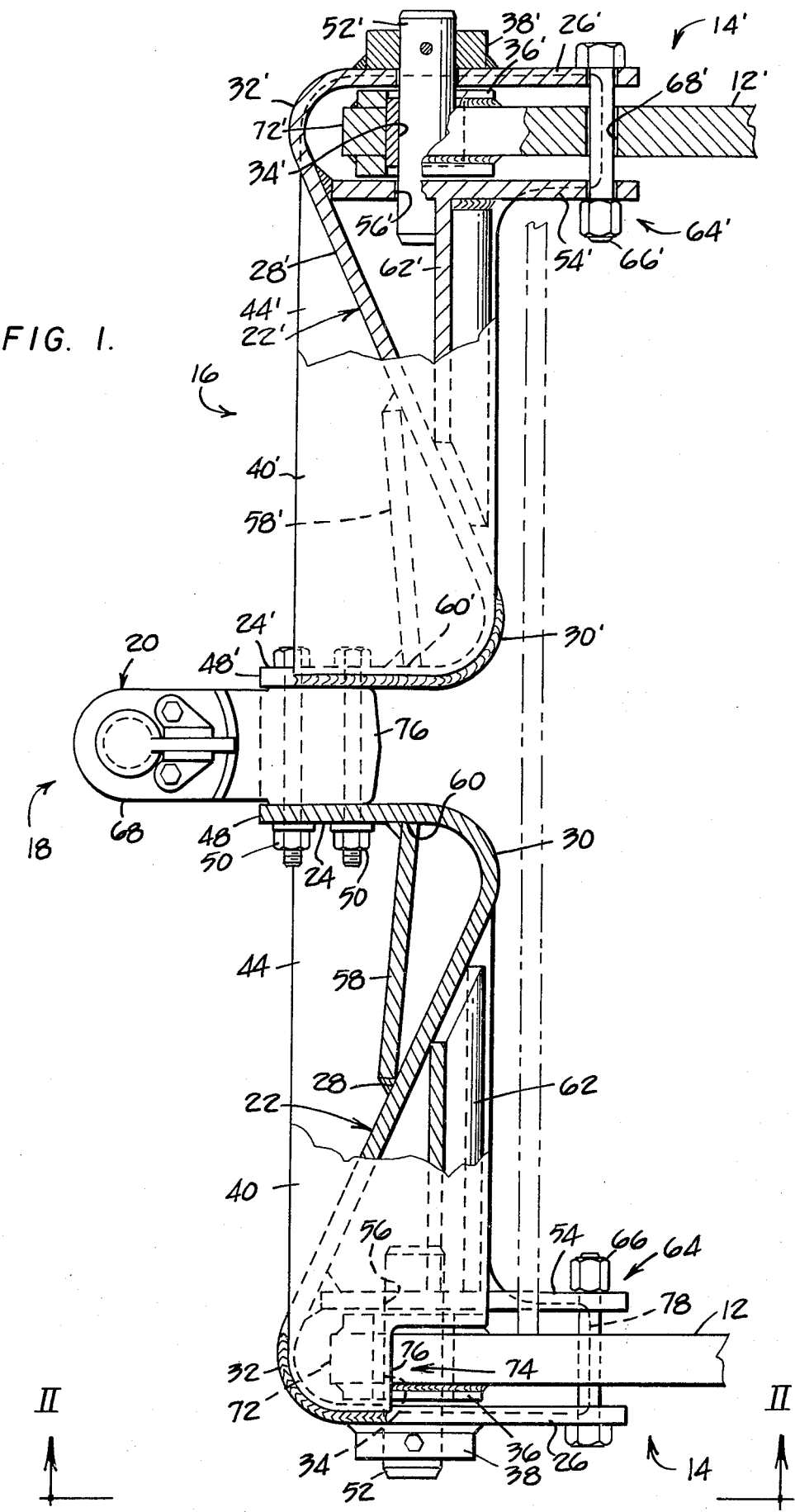
FIG. 1 illustrates in top view, partially cut away, a drawbar unit in accordance with the present invention.

Adverting now to the figures of the drawings there is illustrated therein a vehicle, part of which is shown very generally at 10 and which comprises a pair of generally vertical frame members 12, 12', one extending along each side 14, 14' of the vehicle 10 to a rearward end 16 thereof. The present invention relates most particularly to a drawbar unit 18 which is particularly useful in such a structural environment.

A hitch 20 is supported generally centrally intermediate the frame members 12, 12' and adjacent the rearward end 16 of the vehicle 10. In accordance with the present invention the pair of generally Z-shaped brace means 22, 22' serve to supportingly hold the hitch 20 in place. Each of the Z-shaped brace means 22, 22' have a first leg 24, 24' thereof supportingly and generally removably securingly affixed to the hitch 20. A second leg 26, 26' of the Z-shaped brace means 22, 22' respectively is affixed to a respective one of the frame members 12, 12'. A respective bridge 28, 28' extends from generally a forward end 30, 30' of the respective first leg 24, 24' to generally a rearward end 32, 32' of the respective second leg 26, 26'. The aforementioned structures thus define the basis of the bracing structure of the present invention.

Generally, there are a pair of generally coaxially aligned aperture means 34, 34', one of which is seen in FIG. 1 in cut away view, one of said aperture means 34, 34' passing generally horizontally through each of the respective frame members 12, 12' adjacent the rearward end 16 of the vehicle 10. The frame means 12, 12' are generally reinforced via reinforcing means 36, 36' so as to extend somewhat the length of the respective aperture means 34, 34' and to thereby provide overall strength at the points of affixation of the Z-shaped brace means 22, 22' to the respective frame members 12, 12'. Similarly, the respective second legs 26, 26' of the Z-shaped brace means 22, 22' are generally reinforced by reinforcing means as illustrated at 38, 38' to again provide additional strength at the area of attachment of the respective second legs 26, 26' to the respective frame members 12, 12'.

To provide extra rigidity to the drawbar unit 18, a pair of upper generally horizontal plates 40, 40' are integrally affixed, one to a top 42, 42' of each of the respective brace means 22, 22'. Also, a pair of lower generally horizontal plates 44, 44' are integrally affixed to a respective bottom 46, 46' of each of the brace means 22, 22'. Thus, a box like support is provided with the bridges 28, 28' of the Z-shaped brace means 22, 22' providing significant rigidity thereto. Also, the area from the respective rearward end, 32, 32' of the respective second legs 26, 26' to a respective rearward end 48, 48' of the respective first leg 24, 24' is open thus allowing easy access to the means which secure the hitch 20 to the respective first legs 24, 24' of the respective Z-shaped brace means 22, 22'. In the embodiment illustrated it is clear that nut and bolt means 50 serve to removably secure the hitch 20 to the respective first legs 24, 24' of the Z-shaped brace means 22, 22'.

A pair of pin means 52, 52' serve for affixing each respective one of the members 12, 12' to a respective one of the second legs 26, 26'. Thus, the pins 52, 52' are seen to be held in bores within the respective support structures 36, 36' and 38, 38' associated respectively with the respective frame 12, 12' and the respective second leg 26, 26'.

It is desirable to provide a pair of generally vertical walls 54, 54', one integrally affixed to each of the Z-shaped brace means 22, 22' adjacent to and generally parallel to second legs 26, 26' thereof and on an opposite side of each respective one of said frame members 12, 12' from said respective second legs 26, 26' of said Z-shaped brace means 22, 22'. When such vertical walls 54, 54' are provided, respective wall hole means 56, 56' are generally provided one passing generally through each of the walls 54, 54' in coaxial alignment with the respective aperture means 34, 34'.

The drawbar unit 18 of the present invention can be advantageously made still more rigid by provision of a pair of first stiffener plate means 58, 58', one affixed between an intermediate portion 60, 60' of each respective one of the first legs 24, 24' and each respective one of the bridges 28, 28'. Further, the drawbar unit 18 can be made more rigid still by the provision of a pair of second stiffener plate means 62, 62', one affixed between each respective one of the generally vertical walls 54, 54' and each respective one of the bridges 28, 28'. It may be necessary to use as the stiffener plate 62, 62', a pair of plates which will not interfere with any portion of the frames 12, 12'. Curved second stiffener plate 62, 62' are illustrated in the figures of the drawings.

The drawbar unit 18 is preferably provided with means for preventing pivoting thereof so that the hitch 20 is substantially prevented from vertical movement. Thus a pair of pivot preventing means 64, 64' are provided which accomplish this purpose. Briefly, the pivot preventing means 64, 64' comprise nut and bolt means 66, 66' which pass through appropriate bores in both frame members 12, 12' and the respective second legs 26, 26' of the Z-shaped brace means 22, 22'. Generally, an additional bore is provided through the vertical walls 54, 54' when such are present. The bores through the respective second legs 26, 26', frame members 12, 12' and vertical walls 54, 54' generally provide a relatively loose fit as illustrated at 68' in FIG. 1. A symmetrical construction exists at the opposite side of the vehicle, although it is not specifically illustrated for convenience and clarity. At the same time, the fit about the respective pin 52, 52' is relatively tight whereby the great majority of forces transmitted from the drawbar unit 18 to the frame 12, 12' proceeds via the respective pins 52, 52'. This serves to prevent shearing of the nut and bolt means 66, 66' while still assuring that they are present to resist any rotating motion in a vertical plain by the hitch.

The hitch 20 is preferably such that it can be adjusted for two different heights above the ground upon which the vehicle 10 is sitting. This can be advantageous in assuring that loads of at least two different heights can be pulled substantially directly forwardly by the vehicle 10. Adverting particularly to FIG. 2 it will be seen that the hitch 20 to accomplish this purpose can be formed of a first portion 67 which is affixed to the first legs 24, 24' by the nut and bolt means 50. Also, the hitch 20 comprises a second portion 68 which is vertically displaced from the first portion 67 with the second portion 68 comprising follower vehicle engaging means such as a post 70 as illustrated. It is clear then that the hitch 20 can be connected as illustrated in FIG. 2 or that alternatively, the hitch 20 can be mounted with the second portion 68 thereof vertically displaced downwardly from the first portion 67 thereof thus providing a second and lower position for the post 70.

It is very desirable that the hitch 20 be as close as reasonably possible to the vehicle 10 to reduce moments created between these structures. Thus, it is desirable that the follower engaging means, in the embodiment illustrated the post 70, extends rearwardly from the rearward end 72, 72' of the frame members 12, 12' a distance of generally no more than about one and one-half times the longitudinal extension from the forward end 30, 30' of the respective of the first legs 24, 24' to the respective rearward ends 48, 48' thereof.

It is preferred that a pair of back-up pivot preventing means, one of which, 74, is illustrated in FIGS. 1 and 2, be provided for preventing each of the second legs 26, 26' respectively from pivoting about affixation thereof to a respective one of the members 12, 12'. Such back-up pivot preventing means 74 operate only when the pair of pivot preventing means 64, 64' either fail or are absent. In the particular embodiment illustrated, the back-up pivot preventing means 74 comprises a ridge 76 formed by a cut out in the upper plate 40. Should forces tend to rotate the hitch 20 about the pins 52, 52' thus tending to rotate the respective second arms 26, 26' about the respective pins 52, 52', and should the pair of nut and bolt means 66, 66' be absent, then the ridge 76 will contact the top of the frame member 22 to prevent pitching which corresponds to the hitch 20 rotating in a clockwise direction. Similarly, the back-up pivot preventing means 74 includes means for preventing pitching corresponding to a counterclockwise movement of the hitch 20. In the particular embodiment illustrated, a portion 78 of the lower plates 44, 44' extends beneath the respective frame members 12, 12' and contacts the bottoms of the respective frame members 12, 12' on attempted counterclockwise rotation of the hitch 20 about the pin means 52, 52'.

It will be seen that the bracing structure, generally the drawbar unit 18 of the present invention, provides very rigid support while still allowing very easy access to the bolt means 50 for the changing of hitches. Further, in utilizing a structure in accordance with the present invention it is possible to operate with the hitch 20 relatively near the rearward end 16 of the vehicle 10. Further, it is a very important feature of the present invention that the drawbar unit 18 is supported by the frame members 12, 12' and is not supported by connection to the transmission case of the vehicle 10.

While the invention has been described in connection with specific embodiments thereof, it will be understood that it is capable of further modificaton, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. A fabricated beam structure comprising,
   a primary plate having spaced substantially parallel opposite end wall portions generally symmetrically positioned with respect to a plane parallel thereto and midway therebetween and having apertures therethrough for entry of external fastener means and the like and being connected by a diagonally disposed intermediate wall portion, and a pair of substantially flat plates disposed on opposite sides of said primary plate and secured thereto in edgeward substantially congruent overlying relation to form a box-like structure but providing a pair of oppositely outwardly opening pockets respectively adjacent to said end wall portion for ready access to said external fastener means and the like which may be extendable through said apertures in said end wall portions.

* * * * *